United States Patent [19]

Gerson

[11] 3,830,151
[45] Aug. 20, 1974

[54] SECTIONING DEVICE FOR ROUNDED FOOD ARTICLE

[76] Inventor: Samuel L. Gerson, P.O. Box 1887, Wilmington, Del. 19899

[22] Filed: June 27, 1972

[21] Appl. No.: 266,593

[52] U.S. Cl................. 99/537, 83/437, 83/451
[51] Int. Cl. ............................................ A47j 17/00
[58] Field of Search ........ 99/509, 537, 556; 83/431, 83/437, 451, 569

[56] References Cited
UNITED STATES PATENTS

| | | | |
|---|---|---|---|
| 1,399,950 | 12/1921 | Fish | 83/451 X |
| 2,645,262 | 7/1953 | Marasco | 83/437 |
| 2,647,549 | 8/1953 | Koch | 99/509 |
| 2,852,053 | 9/1958 | Berry et al. | 83/437 |

FOREIGN PATENTS OR APPLICATIONS

| | | | |
|---|---|---|---|
| 379,705 | 8/1964 | Switzerland | 99/537 |

Primary Examiner—Edward L. Roberts
Attorney, Agent, or Firm—Connolly and Hutz

[57] ABSTRACT

A rounded food article, such as a lemon, tomato or apple, is instantaneously divided into a number of radial sections by forcing it through a conical array of radial blades above which it is impaled on a central spike. The article is forced through the wedge-shaped spaces between the blades by an annular array of tapered wedge-shaped fingers depending from a head to which an operating handle is attached. The plunger assembly slides over a pair of vertical rods towards the blade assembly engaged within a recess in the base. The fingers extend completely through the blades when the plunger is fully engaged within the blades. The substantial weight of the plunger facilitates its rapid downward movement toward the blade, and a set of three legs raise the base sufficiently from the table to allow the food sections to be freely discharged onto it.

15 Claims, 8 Drawing Figures

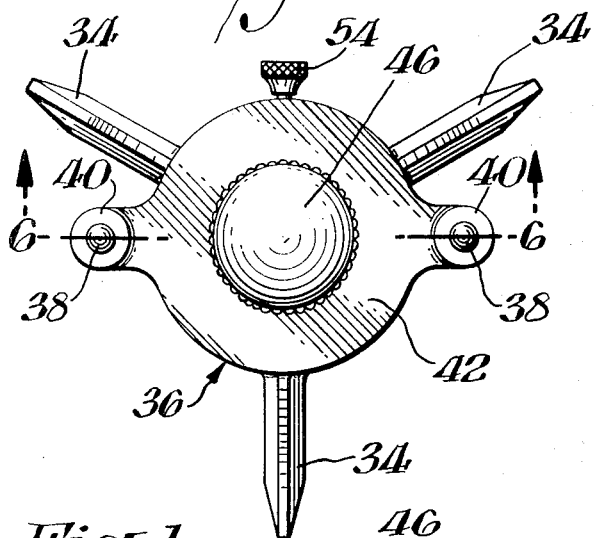
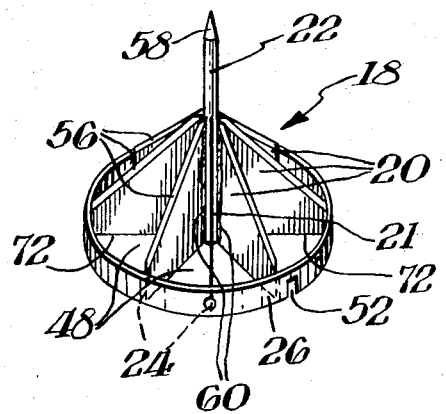
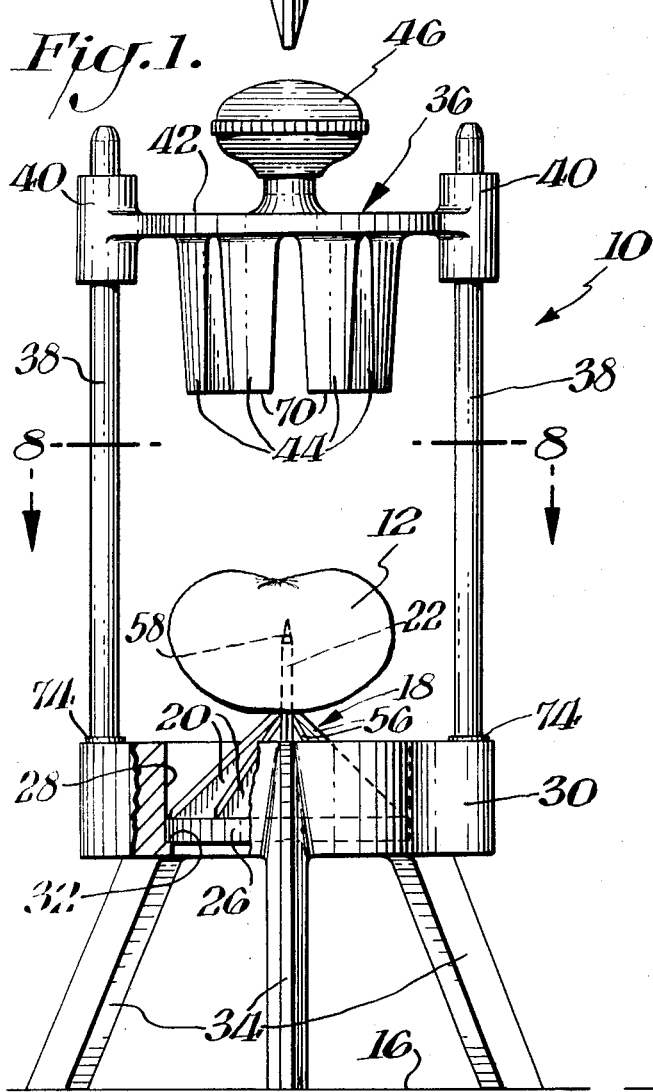
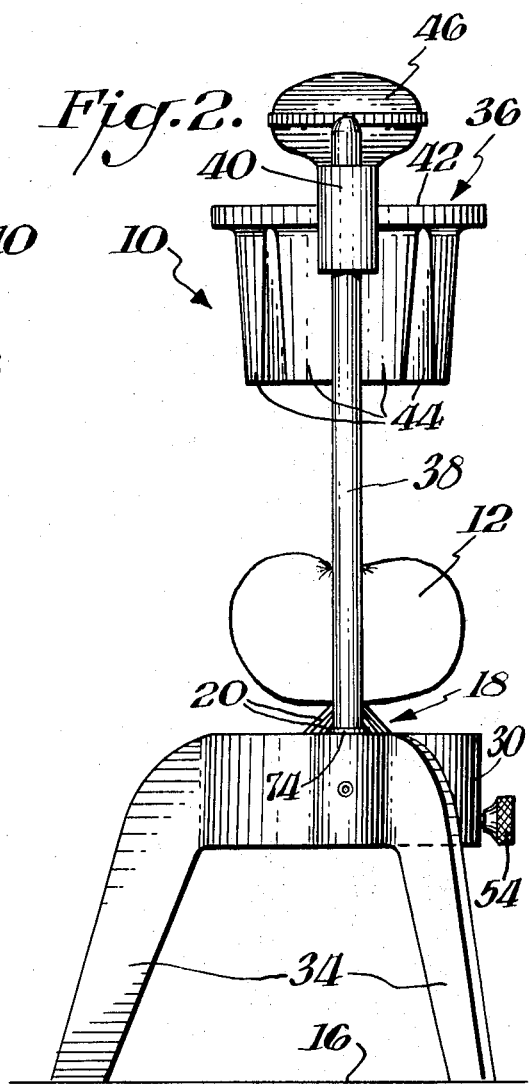

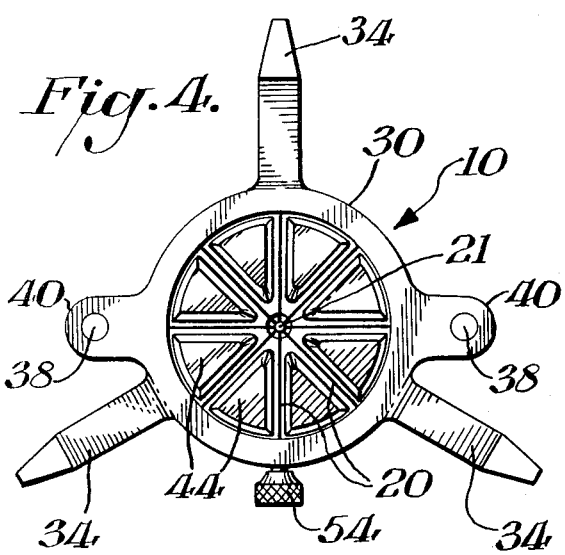
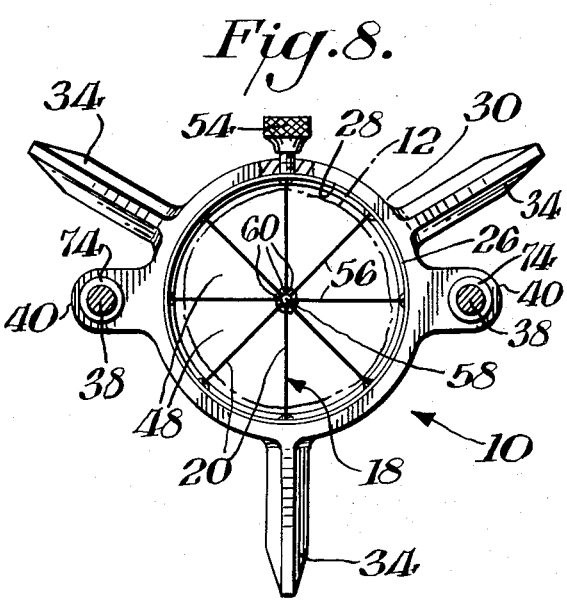
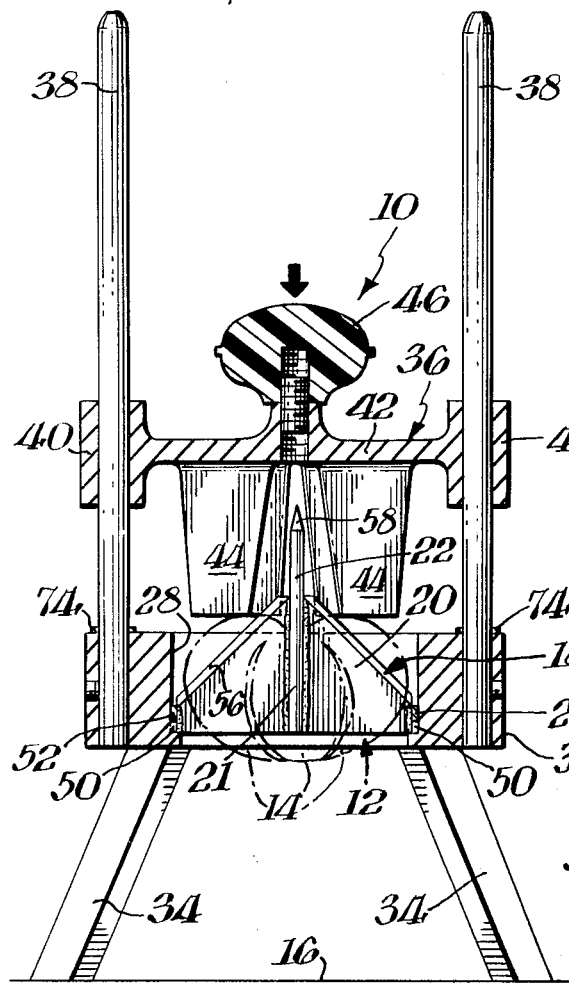
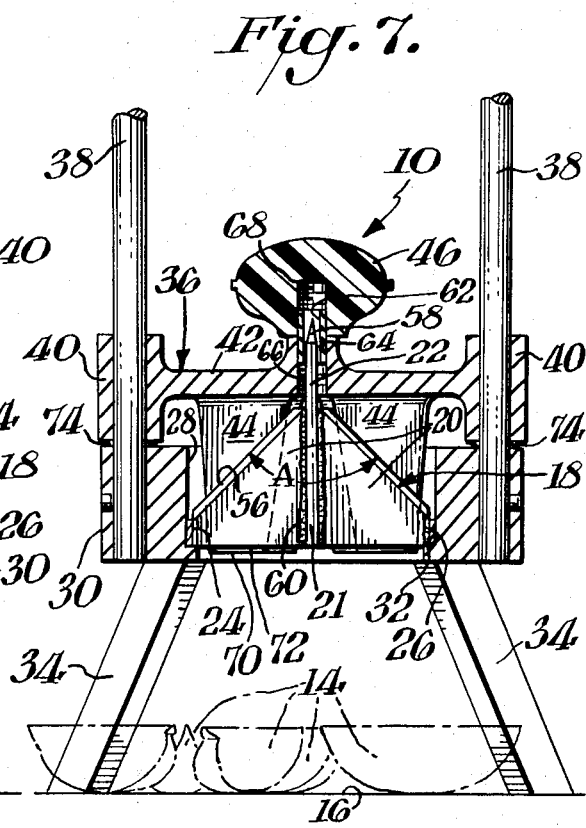

3,830,151

SECTIONING DEVICE FOR ROUNDED FOOD ARTICLE

BACKGROUND OF THE INVENTION

Various fruit sectioning devices have been proposed utilizing relative movement between a conical array of blades and an annular array of holding or pushing elements. These existing devices are useful for sectioning relatively firm food articles such as lemons, oranges or apples—as described in U.S. Pat. Nos. 2,297,177, 2,645,262, 2,647,549 and British Patent No. 379,926 (1932). None of these existing devices are however suitable for sectioning relatively soft, tough-skinned rounded food articles such as tomatoes. An object of this invention is to provide a simple, economical and efficient device for sectioning a wide variety of rounded food articles including tomatoes.

SUMMARY

A rounded food article such as a lemon or tomato is instantaneously divided into a number of radial sections by forcing it through a conical array of sharp radial blades above which it is impaled on a central spike. The blade array is mounted in an elevated base above which a plunger reciprocates up and down, preferably upon a pair of vertical guides. The plunger includes an annular array of tapered substantially wedge-shaped fingers depending from a head upon which an operating handle is mounted. The fingers are long enough to extend completely through the blades in the fully engaged bottom position, and the spike extends upwardly through a cavity in the center of the plunger. The spike is from about ¾ inch to 1½ inch long to securely hold the article aligned above the blades and preferably is about 1¼ inch long. The spike is thick enough to initiate the radial splitting, which is continued and completed by the blade array. The spike is therefore about from 3/32 inch to 3/16 inch thick and preferably about ⅛ inch thick. It has a conical point from about ⅛ to ⅜ inch long, preferably ¼ inch long. The plunger has substantial mass to facilitate application of downward force on the article. The blade array has an apex angle ranging from approximately 60° to 120°, preferably from about 75° to 105° and most effective at about 90°. Sharper angles than 60° would cut but would unduly lengthen the vertical height of the blade array and consequently interfere with the free placement of food articles between the blade array and the plunger. Greater angles than 120° for the apex of the blade array would interfere with their smooth continuation of the radial splitting of the article — initiated by the spike. The conical array of blades is removably mounted in the base to facilitate cleaning and sharpening. The plunger is also removable to facilitate cleaning.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 1 is a front view in elevation of one embodiment of this invention held open with a tomato in position for sectioning;

FIG. 2 is a side view in elevation of the embodiment shown in FIG. 1;

FIG. 3 is a top plan of the embodiment shown in FIGS. 1 and 2;

FIG. 4 is a bottom plan view of the embodiment shown in FIGS. 1–3 with the fingers of the plunger fully engaged within the spaces between the radial blades;

FIG. 5 is a three-dimensional view of the conical blade assembly removed from the embodiment shown in FIG. 1–4;

FIG. 6 is a cross-sectional front view in elevation of the embodiment shown in FIGS. 1–4 in an intermediately engaged position;

FIG. 7 is a cross-sectional front view in elevation similar to FIG. 6 in the fully engaged position with divided food sections discharged; and FIG. 8 is a cross-sectional view taken through FIG. 1 along the line 8—8.

DESCRIPTION OF THE PREFERRED EMBODIMENT

In FIG. 1–8, is shown sectioning device 10 for dividing a rounded food article, such as tomato 12, into a number of wedge-shaped sections or slices 14, which are discharged onto table 16 as shown in FIG. 7. FIG. 5 shows conical array 18 of substantially triangular sharp radial blades 20 mounted about the stem 21 of central spike 22 and with flattened ends 24 secured within outer ring 26. FIG. 1 shows blade array 18 mounted within cylindrical recess 28 in base 30 and resting on shoulder 32 at the bottom of recess 28. A set of three legs 34 supports base 30 far enough above work table surface 16 to freely discharge wedges or slices from it.

FIGS. 1 and 2 also show rounded food article 12 impaled on the upwardly protruding spike 22 in alignment for engagement by plunger 36 mounted above base 30 on linear slide guide means comprised of a pair of smooth round vertical rods 38 mounted upon base 30 and a pair of sleeve bearings 40 connected to the sides of plunger 36.

Plunger 36 includes head 42, from which an annular array of tapered substantially wedge-shaped fingers 44 depend, and upon which operating handle or knob 46 is mounted. Fingers 44 are arranged to freely engage within wedge-shaped spaces 48 between blades 20, and radial indexing of blade array 18 is accomplished, as shown in FIGS. 6 and 7, by engagement of lugs 50 in the bottom of recess 28 within slots 52 in blade array 18. Blade array 18 is locked within recess 28 by set screw 54, and sufficient clearance is provided between outer ring 26 and recess 28 to facilitate insertion and removal of blade array 18 for cleaning and sharpening. The sharp upper surfaces 56 of blades 20 are sharpened in a double bevel to facilitate their splitting action.

The apex angle of conical blade array 18 is designated by letter A and arcuate arrowheads in FIG. 7. Apex angle A ranges for example from approximately 60° to 120°, preferably from about 75° to 105° and most effective at about 90° as shown. Sharper angles than 60° would cut but would unduly increase the height of blade array 18 and consequently interfere with the free placement of large or elongated food articles 12 on spike 22 below plunger 36. The clearance between plunger 36 and blade array 18 is particularly important with relatively longer rounded articles such as pickles. An extremely steep apex angle would require very long guide rods 38 to permit the placement and impaling of pickles or cucumbers on spike 22. Greater angles than 120° for apex angle A would interfere with the smooth entrance of sharp edges 56 after spike 22 and performance of smooth radial splitting of article 12.

Blades 20 of any suitable number may be provided, as well as the eight shown for device 10 which provide eight wedges or sections. Half of the blades may, for example, be omitted to provide only four sections which are especially suitable for tomatoes. Lemons are more suitably divided into six or eight sections.

Spike 22 is, for example, from about ¾ inch to 1½ inch long and preferably about 1¼ inch long. Spike 22 has a conical point 58, which is approximately from ⅛ to ⅜ inch long and preferably about ¼ inch long. Spike 22 also is from about 3/32 inch thick to about 3/16 inch thick and preferably about ⅛ inch thick to initiate the axial rupture of an impaled article 12 which is radially continued and completed by the sharp top edges conical blade array 18. The stem 21 of spike 22 within conical blade array 18 provides a convenient means of attachment for the inner edges of blade 20 and may be suitably flattened or recessed to receive inner edges 60 of blades 20. The portions of stem 21 exposed between connected edges 60 of blades 20 are suitably formed to facilitate smooth cutting or splitting action by blade array 18.

FIG. 7 shows central well 62 within knob 46 and tube 64 which receives spike 22 when device 10 is fully engaged. Tube 64 within knob 46 includes thread 66 at its lower end and thread 68 at its upper end for connection of rod 46 to plunger head 42.

OPERATION

Plunger 36 is raised high enough to permit a rounded food article such as tomato 12 to be centrally impaled on spike 22 and thus held in alignment for subsequent downward movement of plunger 36 from the raised position shown in FIGS. 1 and 2 to the intermediate position shown in FIG. 6. In FIG. 6, article 12 is pushed substantially within blade array 18 and is almost completely divided into wedge-shaped sections or slices 14, which are still engaged within substantially wedge- or sector-shaped spaces 48 between blades 20.

FIG. 7 shows the fully downward or fully engaged position of plunger 36 in which the lower ends 70 of fingers 44 have passed completely through and slightly past the bottom edges 72 of blades 20 to thus discharge wedges 14 onto table 16.

The clean splitting action of device 10 is highly facilitated by the initial axial rupture performed by spike 22, which is radially continued and completed by sharpened edges 56 of blades 20. The cooperation between spike 22 and sharp edges 56 facilitates the unprecedented clean sectioning of a soft but tough skinned food article, such as a tomato.

The splitting action of device 10 is so effective that it can be successfully performed on both fresh and pickled tomatoes. Other rounded food articles, such as oranges, apples and hard boiled eggs, are also cleanly and swiftly sectioned by device 10. The substantial mass of plunger 36, which is for example made of cast metal, such as white metal or aluminum, facilitates its downward action which is similar to a guillotine. Base 30 may also be conveniently cast of the aforementioned types of metal. Slide rods 38 also may be similarly fabricated or made of hollow stainless steel or aluminum tubing. Downward movement of plunger 36 toward base 30 is smoothly arrested with shock absorption by rubber washers 74 mounted at the bases of slide rods 38.

I claim:

1. A device for sectioning a rounded food article comprising a base, a conical array of externally sharp radial blades mounted in said base and having an apex disposed remote from said base and substantially wedge-shaped spaces between said blades, a plunger, slide guide means connecting said plunger for reciprocating movement relative to said base from said apex towards said base and return, said plunger including an annular array of fingers depending from it which freely engage within said wedge-shaped spaces between said radial blades when said plunger is moved toward said blades, stop means on said base and plunger for terminating their engagement with each other, said fingers being long enough to substantially pass through said blades when said movement of said plunger into engagement with said base is terminated, and a spike centrally mounted upon the outside point of said apex for holding said article aligned for engagement by said plunger and for initiating the radial splitting of said article which is continued and completed by said blades.

2. A device as set forth in claim 1 wherein said spike ranges approximately from ¾ inch to 1½ inch long and from about 3/32 inch to 3/16 inch thick.

3. A device as set forth in claim 2 wherein said spike has a substantially conical point ranging from about ⅛ inch to ⅜ inch long.

4. A device as set forth in claim 1 wherein said fingers are tapered.

5. A device as set forth in claim 1 wherein said plunger includes a head to which said fingers are connected and an operating handle is mounted upon said head.

6. A device as set forth in claim 5 wherein said operating handle comprises a knob.

7. A device as set forth in claim 5 wherein said fingers are substantially wedge-shaped.

8. A device as set forth in claim 1 wherein said conical blade array has an apex angle, and said apex angle ranges from approximately 60° to 120°.

9. A device as set forth in claim 1 wherein said conical blade array has an apex angle, and said apex angle ranges from approximately 75° to 105°.

10. A device as set forth in claim 1 wherein said base has a cylindrical recess, said blade array including a cylindrical ring within which said conical array of radial blades is mounted to form a blade assembly, said cylindrical recesses being large enough to facilitate insertion and removal of said blade assembly, radial indexing means in said base and blade assembly for radially aligning said blade assembly to freely receive said fingers, and removable locking means for securing said blade assembly in said base.

11. A device as set forth in claim 1 wherein legs extend downwardly from said base for elevating it above a working surface to permit the sections of said food article to be discharged from said device.

12. A device as set forth in claim 1 wherein said plunger includes a central well for receiving said spike.

13. A device as set forth in claim 1 wherein said spike includes a stem to which said radial blades are attached.

14. A device as set forth in claim 1 wherein said slide guide means comprises a pair of vertical rods mounted on said base at the sides of said blades and a pair of slide bearings on said plunger engaging said rods.

15. A device as set forth in claim 1 wherein said plunger has substantial mass for facilitating its downward movement.

* * * * *